Figure 1:
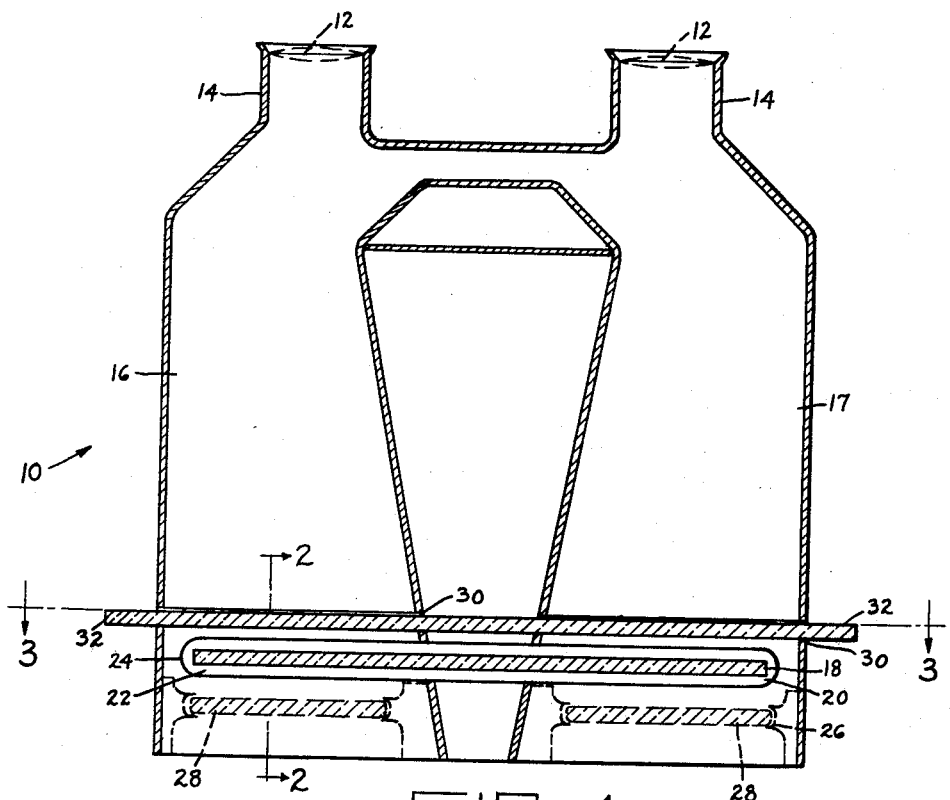

March 29, 1960        S. DOMESHEK        2,930,142

STEREOSCOPIC RANGE ESTIMATING TRAINING DEVICE

Filed Aug. 12, 1953        3 Sheets-Sheet 1

INVENTOR
SOL DOMESHEK

BY

ATTORNEY

March 29, 1960     S. DOMESHEK     2,930,142
STEREOSCOPIC RANGE ESTIMATING TRAINING DEVICE
Filed Aug. 12, 1953     3 Sheets-Sheet 2

INVENTOR
SOL DOMESHEK
BY
ATTORNEY

March 29, 1960 — S. DOMESHEK — 2,930,142
STEREOSCOPIC RANGE ESTIMATING TRAINING DEVICE
Filed Aug. 12, 1953 — 3 Sheets-Sheet 3

INVENTOR
SOL DOMESHEK
ATTORNEY

United States Patent Office 2,930,142
Patented Mar. 29, 1960

2,930,142

STEREOSCOPIC RANGE ESTIMATING TRAINING DEVICE

Sol Domeshek, Great Neck, N.Y.

Application August 12, 1953, Serial No. 373,925

2 Claims. (Cl. 35—10.4)

(Granted under Title 35, U.S. Code (1952), sec. 266)

The invention described herein may be manufactured and used by or for the Government of the United States of America for governmental purposes without the payment of any royalties thereon or therefor.

The invention relates to a stereoscopic viewing device and more specifically, stereoscopic binoculars adapted to train students in estimating range.

There are various types of stereoscopic devices in use today, some of which employ a card wheel to retain a plurality of transparent images, others effect the same results by means of a film strip and some others employ two separate card transparencies. These viewers are not satisfactory when used in training, since there is no provision for measuring range to the image. Also, where visibility variations are desired to be reproduced, as would occur under differing weather conditions, there is no provision for such simulation. In addition, means to adjust the interocular distance of the device to the individual's interocular distance for most effective viewing, is ordinarily not provided. The stereoscope of the invention overcomes these inadequacies in an effective and inexpensive manner.

A major object of the invention is to provide a stereoscope viewer that is capable of accommodating a wide range of interocular distances.

Another object of the invention is to provide a three dimensional film viewer including means to measure the range to the images to train students to accurately estimate distances.

Another object of the invention is to provide a three dimensional film viewer capable of varying visibility conditions for any pair of stereo slides in order to give the observer the illusion of looking at an object under various sea and sky color conditions.

Yet another object of the invention is to imitate the construction of binoculars to increase the realism of the simulation.

Still another object of the invention is to provide a convenient means to change from one stereoscopic view to another.

Yet another object of the invention is to reproduce in both magnification and stereoptically the visual characteristics of a pair of standard type binoculars.

A feature of the invention reides in the method for moving the stereoscope ranging slide so that the indicia thereon will appear to recede from the foreground into the distance.

Another feature of the invention resides in a lateral displacement of the stereoscope ranging slide so that distances to objects other than those occupying the center of the field in the stereo films may also be determined.

Yet another feature of the invention resides in the provision of slots behind the transparencies for the insertion of filters to simulate various weather conditions either singly or in combination.

Figure 3:
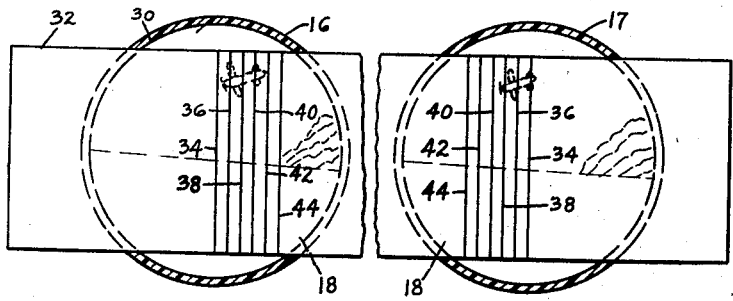
Figure 2:
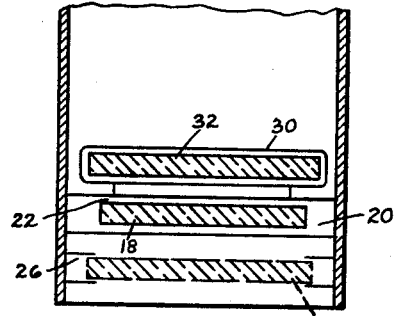
Figure 6:
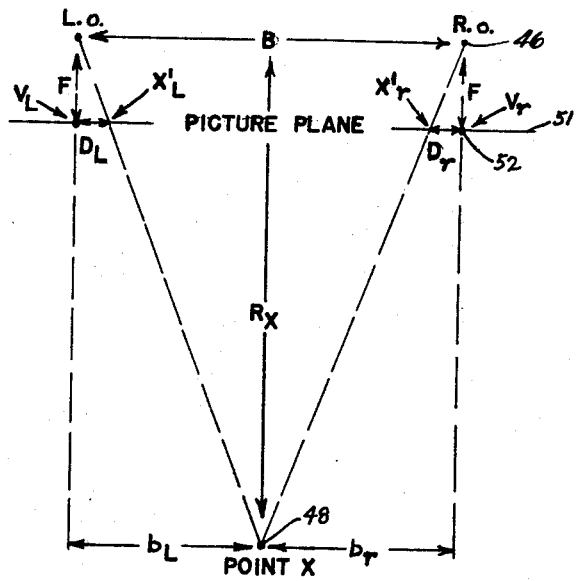
Figure 5:
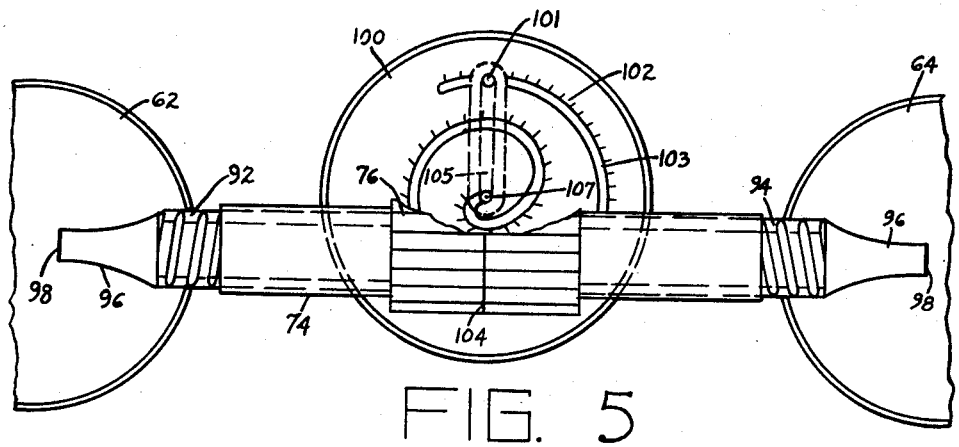
Figure 4:
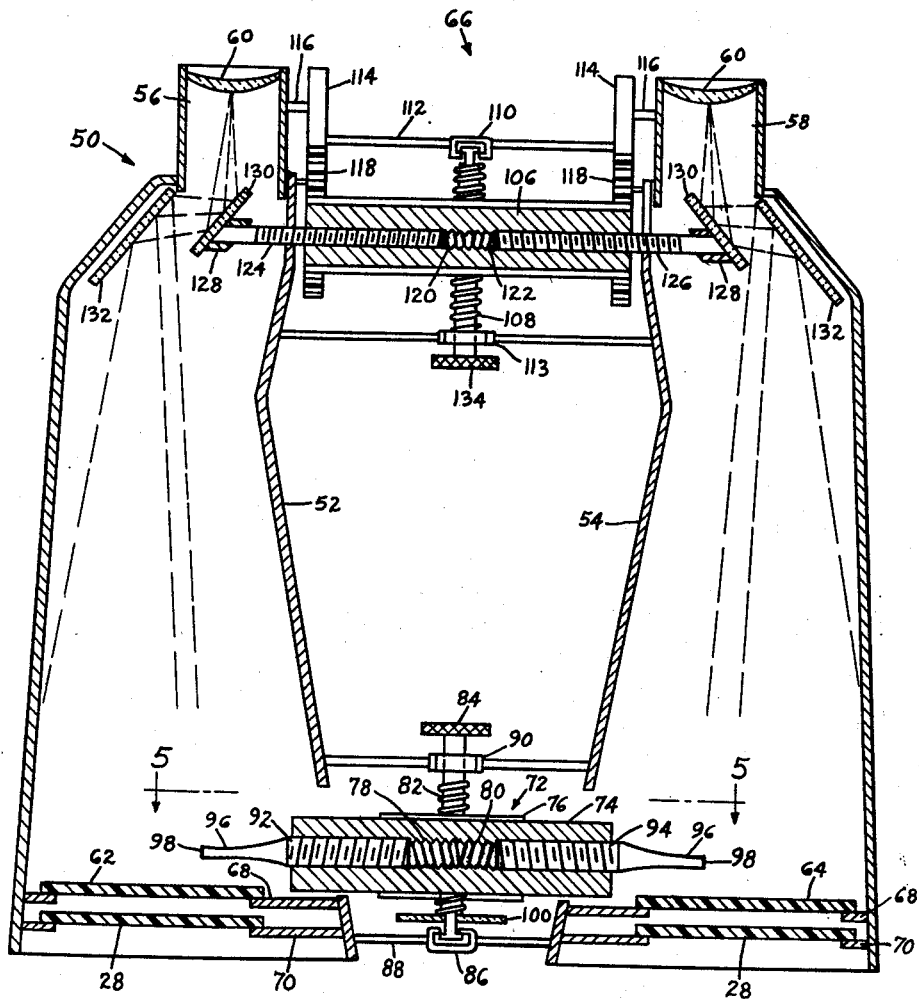

Other objects and many of the attendant advantages of this invention will be readily appreciated as the same becomes better understood by reference to the following detailed description when considered in connection with the accompanying drawings wherein:

Fig. 1 is a vertical sectional view of a sterescope binocular embodying a preferred form of the invention, Fig. 2 is a section taken on line 2—2 of Figure 1 and illustrates the various elements in position in the stereo binocular, Fig. 3 is a plan view of the range measuring means and is taken on line 3—3 of Fig. 1, Fig. 4 is a vertical section of another form of the invention, Fig. 5 is a plan view of the ranging mechanism taken on line 5—5 of Fig. 4 with a part of the worm structure removed for clarity, and, Fig. 6 is a schematic illustration of the determination of the parallactic distance for any object seen in the stereoscopic slide.

Referring to the embodiment of Figs. 1–3, binoculars 10 are of unitary construction and avoid the use of movable parts. Since the viewing distance of the ocular lenses is constant, the magnification of the transparencies remains constant. The center lines of these ocular lenses are always normal to the picture areas of the transparencies retained in the device. Wide aperture ocular lenses 12 are mounted in eye pieces 14 on binocular tubes or barrels 16 and 17, and magnify the picture on the stereo transparencies 18 retained at the other end of the binocular barrels. The construction of binoculars 10 may be of any suitable material, although one of molded plastic material is preferred, since such type is relatively inexpensive to manufacture.

Stereoscope transparencies 18 may be of any desired type and may be mounted in the form of a card wheel, or by mounting parallel strips on a card, or by a synchronized double reel strip of 35 mm. film. For purposes of illustration, the parallel strip type is used. Since each binocular barrel 16 and 17 is identical in construction, the description will refer only to one barrel, it being understood that the description thereof applies to both. Slot 20 in binocular barrel 16 enables slide 18 to extend into passageway 22, said passageway terminating at wall 24.

Spaced outwardly of passageway 22 is an annular groove or seat 26 receiving filters 28 for simulating atmospheric conditions such as clouds, sun, sea and sky colors, dusk, and the like. For variations in effect, it is possible to use different combinations of these filters in a variety of positions with respect to the film slide 18.

Slots 30 are on diametrically opposed sides of binocular barrels 16 and are in longitudinal alignment to receive stereoscope ranging slide 32. As is illustrated in Figure 3, indicia hair lines are etched on or are photographically applied to slide 32. Indicia hair lines 34 represent the center point of the stereoscopic picture. As will be noted, indicia lines 36, 38, 40, 42, 44 as well as 34 represent the parallactic distance of an object as viewed through a pair of binoculars.

Fig. 6 illustrates the relationships between distance to an object from an observer and parallactic displacements when viewed through a stereoscopic device. The observer sees an image of object 48 on film 51. The parallactic distance on the picture plane of film 51 is greater or smaller depending upon how great the distance $R_x$ is between the objective lens 46 and the object 48. The total parallactic distance for an image in a stereoscopic view is the sum of the component parallactic distances for the pair of stereoscopic pictures, and, provided all other conditions remain the same, the sum of the component parallactic distances is a constant for any object lying in a plane parallel to the planes of the stereoscopic views and at a distance $R_x$ from the objective lenses. Thus, if object 48 were moved in the same aforesaid plane to a new position, the sum of the parallactic distances of the new position would be equal to the sum of the parallactic distances of the original position. In the figure:

L.o.=left objective lens
R.o.=right objective lens
B=distance between the objective lens (fixed)
F=focal length of the objective lens (fixed)
$V_L$=image of the point at infinity on the left picture
$V_r$=image of the point at infinity on the right picture
$X'_L$=image of the point X on the left picture
$X'_r$=image of the point X on the right picture
X=any point in space at a finite distance from the left object and the right object lenses
$R_x$=range from the object lenses to point X
$b_L$=distance from point X to the line of sight of the left objective lens
$b_r$=distance from point X to the line of sight of the right objective lens It is apparent from Figure 6 that, (a) The line of sight from the left objective lens to the image of a point at infinity on the left picture and the line of sight from the right objective lens to the image of a point at infinity on the right picture are parallel, and (b) The normal distances from point X to the line of sight of the left objective lens and from point X to the line of sight of the right objective lens are coincident with each other and are parallel to the line joining the objective lenses, and when added together, are equal to the distance between the objective lenses.

Then, from similar triangles:

$$\frac{D_r}{b_r}=\frac{F}{R_x} \text{ and } \frac{D_L}{b_L}=\frac{F}{R_x}$$

From which $$R_x=\frac{Fb_r}{D_r}=\frac{Fb_L}{D_L}$$

$$\therefore \frac{b_r}{D_r}=\frac{b_L}{D_L}=\frac{b_r+b_L}{D_r+D_L}$$

But: $b_r+b_L=B$ which is a constant.

Then: the sum $D_r+D_L$, which may be called D, must, for any point at range $R_x$, also be a constant, and it therefore must follow that $$R_x=\frac{FB}{D}$$

Since F and B are constants for a given instrument, the above expression defines directly the relation between D for a point from a pair of pictures and the actual range to that point. It may, therefore, be used to measure ranges to any points in any pairs of pictures for which F and B are known.

Returning to Figure 3, similar slides 18 are retained in barrels 16 and 17. When viewed through the binoculars, a three dimensional picture is seen, in a manner well known in the stereoptic art. Indicia 34 on range slide 32 will overlie the center of the pictures in lens barrels 16 and 17. Indicia lines 36, 38, 40, 42 and 44 are provided at spaced intervals inwardly towards the right in barrel 16 and inwardly towards the left in barrel 17. Each hair line 36 is spaced at the same distance from line 34 so that when viewed through binocular 10, they merge into a single line. The same is true for each of the other hair lines. However, due to the parallactic effect described above, hair line 34 appears to be farthest away with the other hair indicia lines progressively appearing closer to the observer with indicia line 44 the shortest distance away from the observer.

When the binoculars are to be used for training purposes, a stereoscope slide 18 is positioned within passageways 22, and a three dimensional picture is seen. Stereoscope ranging slide 32 is inserted through slots 30 provided in the inner and outer sides of the barrel. A three dimensional image is obtained and lines 34 are seen as a single hair line. Lines 36 to 44 are also seen respectively as single hair lines progressively closer in the manner described above. This is due to the parallactic distance effect described above. By moving ranging slide 32 longitudinally, when a specific hair line overlies a specific figure in the image on slide 18, it is known that such line, as well as the image, are in the same plane. If each hair line represents a known distance, the total range is obtained by multiplying the number of indicia lines between line 34 and the line overlying the object by the given distance between each line. Assume that hair line 40 overlies an object in the picture. Assume also that the maximum range is 5000 yds. and that each indicia line represents a distance of 1000 yds. Line 40 is 2000 yds. away and therefore any object lying in that plane is also 2000 yds. away.

The indicia lines have been spaced in exaggerated relation for clarity of description and are normally much closer together. Also, slot 30 is close to passageway 22 so that ranging slide 32 closely overlies stereoscope slides 18.

When atmospheric conditions are to be introduced into the training device, colored light diffusion slides 28 are pressed into annular seats 26 in any desired combination.

The principle described above is carried out in the modified form of the invention illustrated in Figures 4 and 5. In this form of the invention the binoculars are designed to provide for individual adjustment of interocular distances while maintaining the viewing distance from the ocular lenses to image plane constant. In this manner, an individual is able to more easily achieve a stereoscopic illusion while the magnification of the transparencies remains constant.

Binoculars 50 comprise optical lens barrels 52 and 54 and eye pieces 56 and 58 adjustable in said lens barrels. Lens elements 60, one for each eye piece, magnify the picture on stereoscopic transparencies 62 and 64. Interocular distance adjusting mechanism 66 maintains constant the length of the path of light from film 62, 64 to ocular lenses 60, as will presently appear.

Transparency slides 62 and 64 are similarly mounted in binoculars 50 and it will be understood that a description of one will also apply to the other slide. Transparency 62 is mounted on an annular platform or rim 68 in binocular barrel 52 through a suitable opening (not shown) in the binocular barrel. Similarly, annular platform 70 is provided below platform 68 and in close proximity thereto to receive filter transparencies for simulating atmospheric conditions, in a manner similar to that described above.

Ranging mechanism 72 is operatively secured on binoculars 50 to measure range for an image appearing on transparency 62. Elongated hollow tube or housing 74 is provided with an external annular gear 76 and is internally provided with left handed threads 78 and right handed threads 80. The gear teeth on gear 76 mesh with a worm gear 82 operated by rotation of knob 84 at one end of worm gear 82. The other end of gear 82 is retained in a housing 86 secured to binoculars 50 by any suitable means, such as tie piece or stays 88. Similarly, sleeve 90 retains worm gear 82 in operative position.

Ranging slides 92 and 94 are slidably received in tubular member 74 and are provided with external left hand threads and right hand threads respectively, to mesh with threads 78 and 80 of tube 74. Ranging slides 92 and 94 include extensions 96 marked with a vertical edge 98 at each extremity thereof. Slides 92 and 94 are held against rotation by any conventional guide means.

Rotation of worm gear 82 rotates tube 74. Rotation of tube 74 imparts linear movement to slides 92 and 94 in opposite directions. Indicia edges 98 move outwardly or inwardly in unison and therefore overlie the identical images on stereoscopic slides 62 and 64. When viewed in three dimensional effect, the hair lines appear as a single line cutting the image below. The distance between the two hair lines represents the distance of the three dimensional image from the observer. This distance is read on a scale disc 100 fixed on worm 82 just beneath tubular housing 74 (see Fig. 5). Suitable distance indicia 102, ranging from zero to the maximum range is marked on disc 100. As worm 82 is rotated, pin 101 travels in spiral slot 103 on disc 100. Hook member 105, secured to housing 86, forms a pair of parallel guides to guide pin 101 in the spiral direction and is mounted at 107 to receive worm 82. Circumferential scribe line 104 on gear 76 indicates the point at which the reading is to be taken.

Interocular distance adjusting mechanism 66 allows the binoculars to be adjusted for the individual and yet keep the viewing distance constant.

Tubular member 106 is similar to member 74 except that it is in the form of an elongated external spur gear with the teeth thereof meshing with worm 108. Worm 108 is captive in housing 110 retained by means of wire stays 112 secured to the housing and to the upper end of binoculars 50. Sleeve 113 helps maintain worm 108 in operative position. Rack members 114 are secured to each eye piece 56 and 58 by means of connecting bars 116, the teeth 118 thereof meshing with tube 106. It is obvious therefore, that rotation of member 106 causes rack members 114 to move inwardly or outwardly and thereby adjust eyepieces 56 and 58. Tubular member 106 is also internally threaded with left hand screw threads 120 and right hand threads 122, in a manner similar to member 74. Threaded shafts 124 and 126 are slidable within tubular housing 106 and are housed in sleeves 128 on their outer extremities. Shafts 124 and 126 are held against rotation by any conventional guide means. Ocular mirrors 130 are mounted at 128 in angular relation to lenses 60. Fixed objective mirrors 132 are secured within binocular barrels 52 and 54 in parallel relation to ocular mirrors 130.

In the operation of the device, the observer places the transparencies within the binocular barrels. Upon gazing into eyepieces 56 and 58, rotation of worm gear 108 by means of knob 134 imparts rotation to tubular spur gear 106. Racks 114 move in and out, carrying eyepieces 56 and 58 along. Simultaneously, occular mirrors 130 move laterally on stems 124 and 126, thereby maintaining the path of light from the stereoscope transparencies to ocular lenses 60 constant at all times for all interocular distances. The magnification of the transparencies remains constant. In this form of the invention, it is possible to adjust the interocular distance for the eyes of the individual observer.

To determine the range of the image seen, worm 82 is rotated to rotate tubular housing 74 for longitudinal movement of ranging slides 92 and 94. The point at which indicia edges 98 cut through the image, indicates that both are in the same plane, and the distance read on disc 100 designates the range of the image from the observer. Weather and visibility conditions may be simulated realistically by inserting the proper slide in binoculars 50.

While by no means limited to such use or construction, the device could be designed to simulate a standard Navy 7×50 binocular telescope. Stereoscopic transparencies taken with the proper air base and a given magnification, combined with the ocular lenses chosen to yield the proper magnification, will produce the required magnifying and stereoscopic characteristics.

Obviously many modifications and variations of the present invention are possible in the light of the above teachings. It is therefore to be understood that within the scope of the appended claims the invention may be practiced otherwise than as specifically described.

What is claimed is:

1. A range training device comprising a pair of binoculars having spaced optical barrels and eye pieces in said barrels, first slots on the inner sides of said optical barrels and extending laterally through the barrel towards the outer sides thereof to receive stereoscopic image slides, second slots extending through said barrels in spaced relation to said first slots; an elongated range slide in said second slots, and parallactic distance indicia on said slide adapted to overlie the image slides and to extend from the center of the stereoscopic image towards the inner sides of the barrels, the indicia appearing as a single row of lines varying in distance, whereby the the range is determined when a specific line overlies a particular object in the stereoscopic image.

2. The combination of claim 1 wherein the lens barrels include annular seats beneath the image slots to retain simulated atmospheric condition means.

References Cited in the file of this patent

UNITED STATES PATENTS

| | | |
|---|---|---|
| 934,916 | Von Hofe | Sept. 21, 1909 |
| 1,743,952 | Barr et al. | Jan. 14, 1930 |
| 1,785,448 | Hugershoff | Dec. 16, 1930 |
| 1,816,181 | Eliel | July 28, 1931 |
| 1,864,899 | French | June 28, 1932 |
| 1,894,148 | Barr | Jan. 10, 1933 |
| 2,196,905 | Sherman | Apr. 9, 1940 |
| 2,420,633 | Wittel et al. | May 13, 1947 |
| 2,492,969 | Crane | Jan. 3, 1950 |
| 2,493,770 | Manning | Jan. 10, 1950 |
| 2,510,848 | Wood | June 6, 1950 |
| 2,569,498 | Schatter | Oct. 2, 1951 |
| 2,625,854 | Hayward | Jan. 20, 1953 |